US011173984B2

(12) United States Patent
McDonald et al.

(10) Patent No.: US 11,173,984 B2
(45) Date of Patent: Nov. 16, 2021

(54) CLAMPED CHAINRING ASSEMBLY FOR ELECTRIC BICYCLE

(71) Applicant: Specialized Bicycle Components, Inc., Morgan Hill, CA (US)

(72) Inventors: Ryan James McDonald, Cupertino, CA (US); Jan Talavasek, Knonau (CH); Robin François Ramon Lechevallier, Cham (CH); Marco Werner Sonderegger, Benzenschwil (CH)

(73) Assignee: SPECIALIZED BICYCLE COMPONENTS, INC.

( * ) Notice: Subject to any disclaimer, the term of this patent is extended or adjusted under 35 U.S.C. 154(b) by 161 days.

(21) Appl. No.: 16/448,891

(22) Filed: Jun. 21, 2019

(65) Prior Publication Data
US 2020/0398934 A1   Dec. 24, 2020

(51) Int. Cl.
*B62M 9/00* (2006.01)
*B62M 7/02* (2006.01)
*F16D 1/08* (2006.01)
*F16H 55/30* (2006.01)
*F16D 1/10* (2006.01)

(52) U.S. Cl.
CPC ............... *B62M 9/00* (2013.01); *B62M 7/02* (2013.01); *F16D 1/0864* (2013.01); *F16H 55/30* (2013.01); *F16D 2001/103* (2013.01)

(58) Field of Classification Search
CPC . B62M 6/55; B62M 9/10; B62M 9/00; B62M 7/02; F16D 2001/103; F16D 1/104; F16D 1/0864; F16H 55/30
USPC .......................................................... 180/220
See application file for complete search history.

(56) References Cited

U.S. PATENT DOCUMENTS

| | | | |
|---|---|---|---|
| 2,227,232 A | 12/1940 | Schwinn | |
| 2,287,343 A * | 6/1942 | Duda .................... | F16D 1/0864 29/893.2 |
| 3,501,972 A * | 3/1970 | Morrow ................. | F16H 55/30 474/95 |
| 5,295,917 A * | 3/1994 | Hannum ................ | F16H 55/12 474/95 |
| 10,131,402 B2 * | 11/2018 | Hayslett ................ | H02K 7/116 |
| 2010/0295265 A1 * | 11/2010 | Burdick .................. | B62M 9/04 280/261 |
| 2011/0183805 A1 * | 7/2011 | Chan ...................... | B62M 25/08 475/254 |

(Continued)

FOREIGN PATENT DOCUMENTS

| | | |
|---|---|---|
| DE | 102013200887 A1 | 7/2014 |
| EP | 2546134 A2 | 1/2013 |

OTHER PUBLICATIONS

Extended European Search Report issued by the European Patent Office for Application No. 20180681.7 dated Oct. 19, 2020 (10 pages).

(Continued)

Primary Examiner — Kevin Hurley
Assistant Examiner — Hosam Shabara
(74) Attorney, Agent, or Firm — Michael Best & Friedrich LLP

(57) ABSTRACT

An electric bicycle includes a frame assembly, wheels supporting the frame assembly, a motor assembly coupled to the frame assembly and having a motor output shaft, and a chainring assembly including a mounting portion clamped onto the motor output shaft.

19 Claims, 4 Drawing Sheets

(56) References Cited

U.S. PATENT DOCUMENTS

| 2011/0259658 | A1  | 10/2011 | Huang et al. |           |
|--------------|-----|---------|--------------|-----------|
| 2017/0158284 | A1* | 6/2017  | Hayslett     | B62K 15/00 |
| 2018/0111660 | A1* | 4/2018  | Liu          | B62M 6/55 |
| 2019/0308686 | A1* | 10/2019 | Hendey       | B62K 11/02 |
| 2020/0263767 | A1* | 8/2020  | Allen        | B62M 9/10 |

OTHER PUBLICATIONS

Shimano, "Dura-Ace FC-R9100 11-Speed Crankset", <https://www.competitivecyclist.com/shimano-dura-ace-fc-9100-11-speed-crankset>, web page publicly available at least as early as Dec. 3, 2016.

* cited by examiner

US 11,173,984 B2

CLAMPED CHAINRING ASSEMBLY FOR ELECTRIC BICYCLE

BACKGROUND

The present invention relates generally to the field of electric bicycles ("e-bikes"), and specifically to a chainring assembly for an e-bike.

An e-bike commonly includes a motor assembly configured to provide motive power to the e-bike. For example, the motor assembly can include a motor output shaft configured to revolve. Meanwhile, a chainring assembly of a drivetrain of the e-bike can be coupled to the motor output shaft to permit rotational movement of the motor output shaft to be translated to the chainring assembly of the drivetrain.

DETAILED DESCRIPTION

In some embodiments, an e-bike includes a frame assembly, wheels supporting the frame assembly, a motor assembly coupled to the frame assembly and having a motor output shaft, and a chainring assembly including a mounting portion clamped onto the motor output shaft.

In yet other embodiments, a chainring assembly includes a mounting portion having a circumferential ring with a radial slot permitting the chaining assembly to be clamped onto a motor output shaft of a motor assembly of an e-bike.

Other elements of the invention will become apparent by consideration of the detailed description and drawings.

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
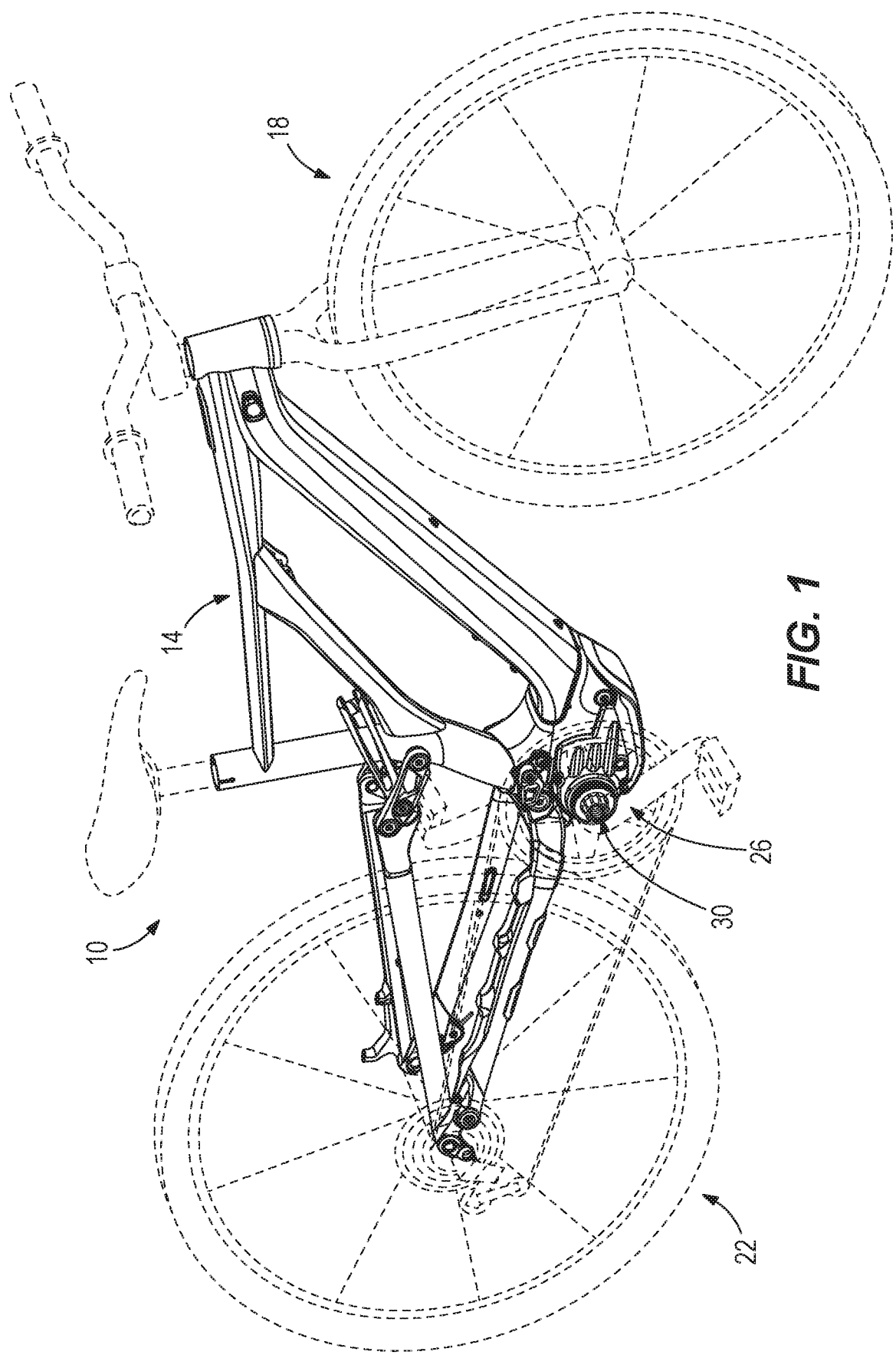
FIG. 1 is a perspective view of an e-bike, according to an embodiment.

Referring to the drawings, FIG. 1 is a perspective view of an electric bicycle ("e-bike") 10, according to an embodiment. In many embodiments, e-bike 10 can comprise a pedal-assist e-bike and/or a power-on-demand e-bike. In some embodiments, e-bike 10 can comprise a pedal-assist e-bike and not a power-on-demand e-bike, or vice versa.

In many embodiments, and as illustrated in FIG. 1, the e-bike 10 includes a frame assembly 14, a first wheel 18 coupled to and supporting the frame assembly 14, and a second wheel 22 coupled to and supporting the frame assembly 14. The e-bike 10 also includes a motor assembly 26 coupled to the frame assembly 14. The motor assembly 26 can be operable to provide motive power to the e-bike 10. For example, the motor assembly 26 can include an electric motor. The electric motor can generate motive power from electricity supplied to the electric motor, such as, for example, by a battery of the e-bike 10. In many embodiments, and as illustrated in FIG. 1, the motor assembly 26 can be located generally at a lower portion of the frame assembly 14 and the e-bike 10, although in other embodiments, the motor assembly 26 can be located elsewhere at the frame assembly 14 and the e-bike 10.

In many embodiments, the motor assembly 26 includes a motor output shaft 30. The motor output shaft 30 can extend laterally outwardly at a side of the e-bike 10 and/or motor assembly 26. Further, the motor output shaft 30 can be configured to revolve about or around a center axis of the motor output shaft 30. For example, in some embodiments, the motor output shaft 30 can be rotated by the electric motor of the motor assembly 26.

Figure 2:
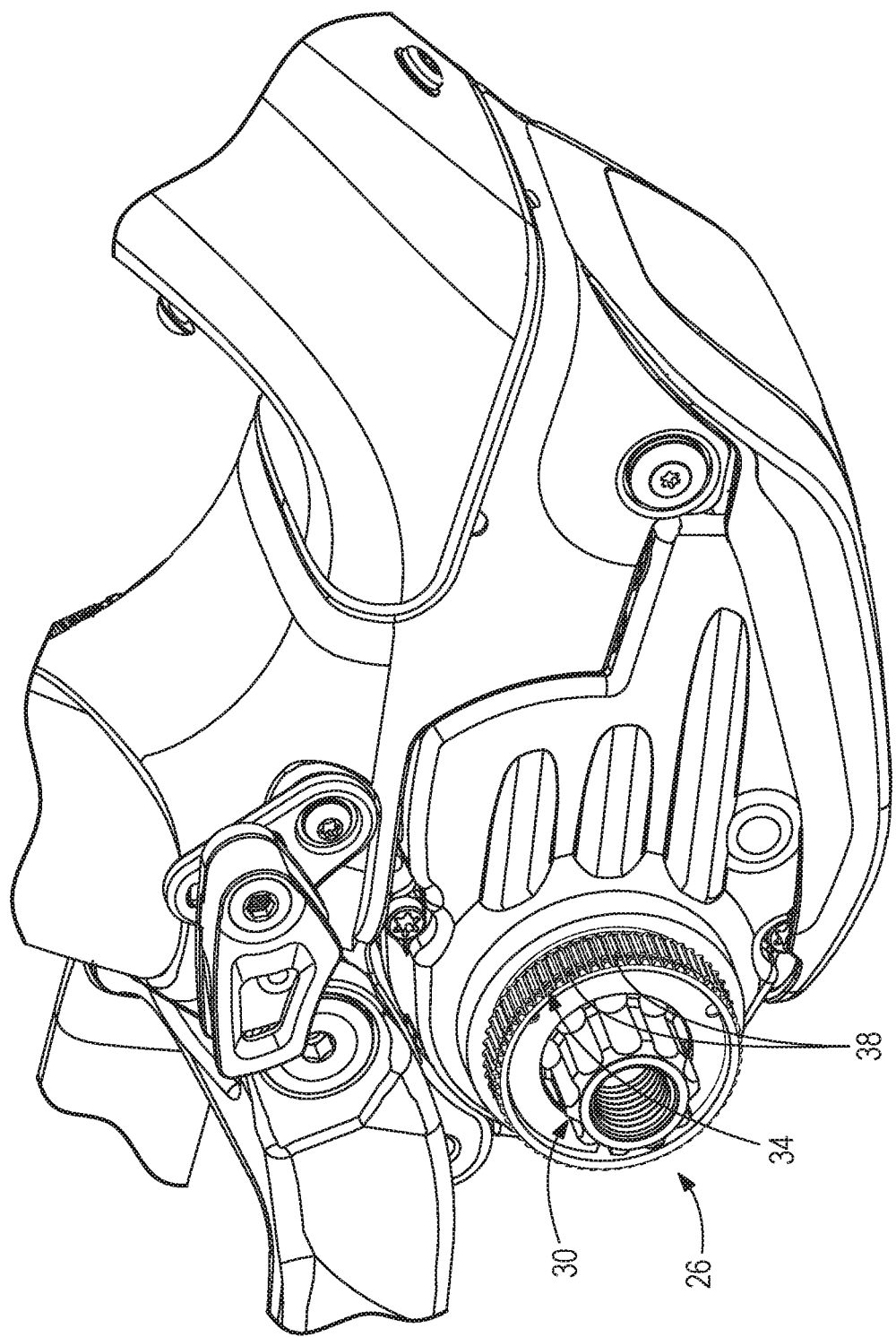
FIG. 2 is an enlarged view of a lower portion of the e-bike of FIG. 1, illustrating a motor output shaft of the e-bike.

Referring to FIG. 2, in many embodiments, the motor output shaft 30 can include a splined region 34. Further, in some embodiments, the motor output shaft 30 can include a hub region. The splined region 34 can extend circumferentially about or around the center axis, and in some embodiments, the hub region of the motor output shaft 30. Further, the splined region 34 can include splines 38 (e.g., ridges or teeth) at an outer circumference of the splined region 34. The splines 38 can extend axially parallel to the center axis of the motor output shaft 30 and radially away from the center axis of the motor output shaft 30. In some embodiments, the splines 38 can be spaced (e.g., evenly spaced) apart from one another. Further, in some embodiments, adjacent splines of the splines 38 can be approximately parallel to each other. In many embodiments, the splines 38 can be implemented (e.g., sized, shaped, arranged, and otherwise configured) according to a spline standard. For example, in some embodiments, the splines 38 can be implemented according to a DIN spline standard of the German Institute of Standardization headquartered in Berlin, Germany. In many embodiments, a quantity of the splines 38 can be determined based on the spline standard implemented.

Figure 3:
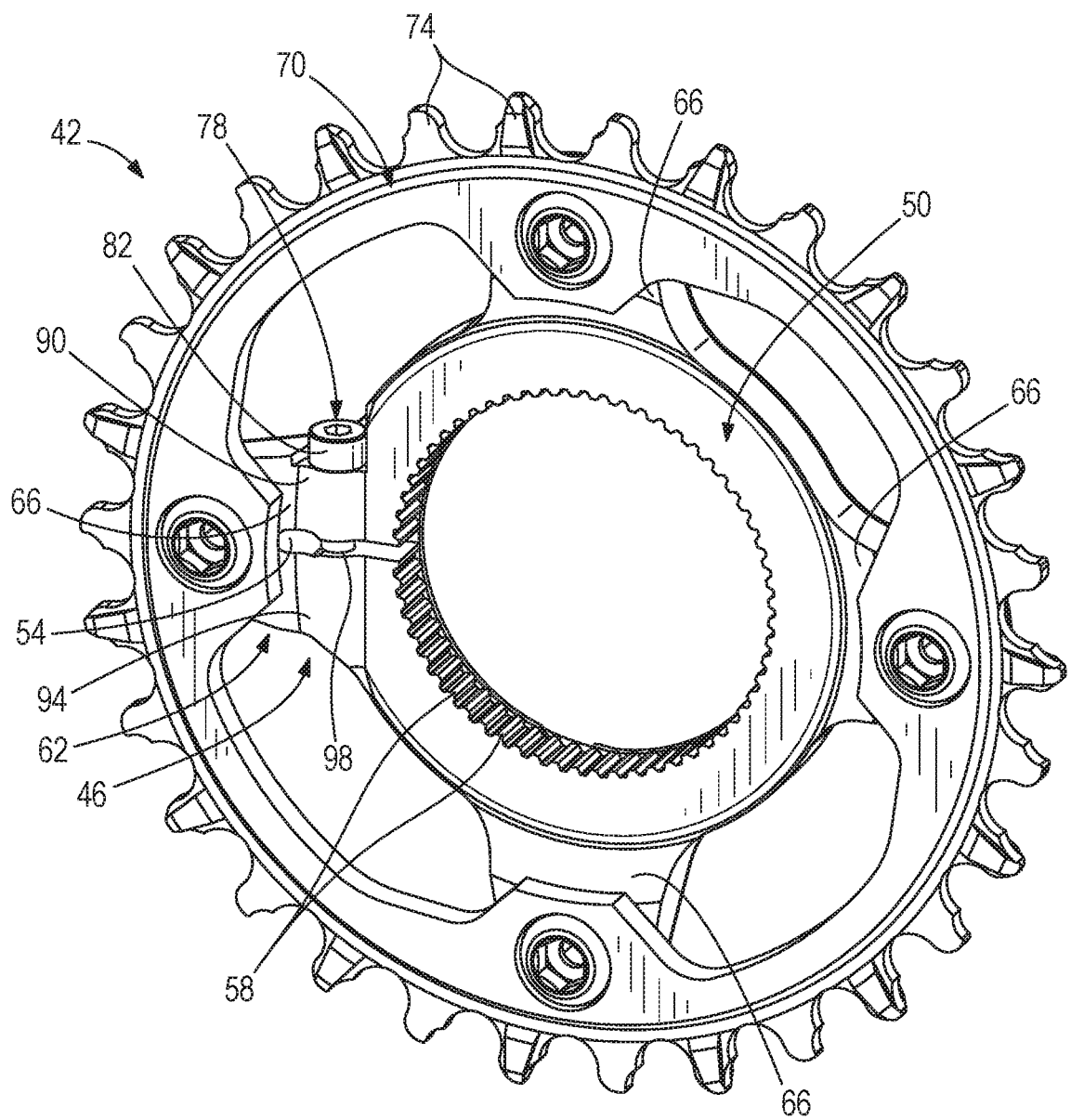
FIG. 3 is a rear perspective view of a chainring assembly configured to be coupled to the motor output shaft.
Figure 4:
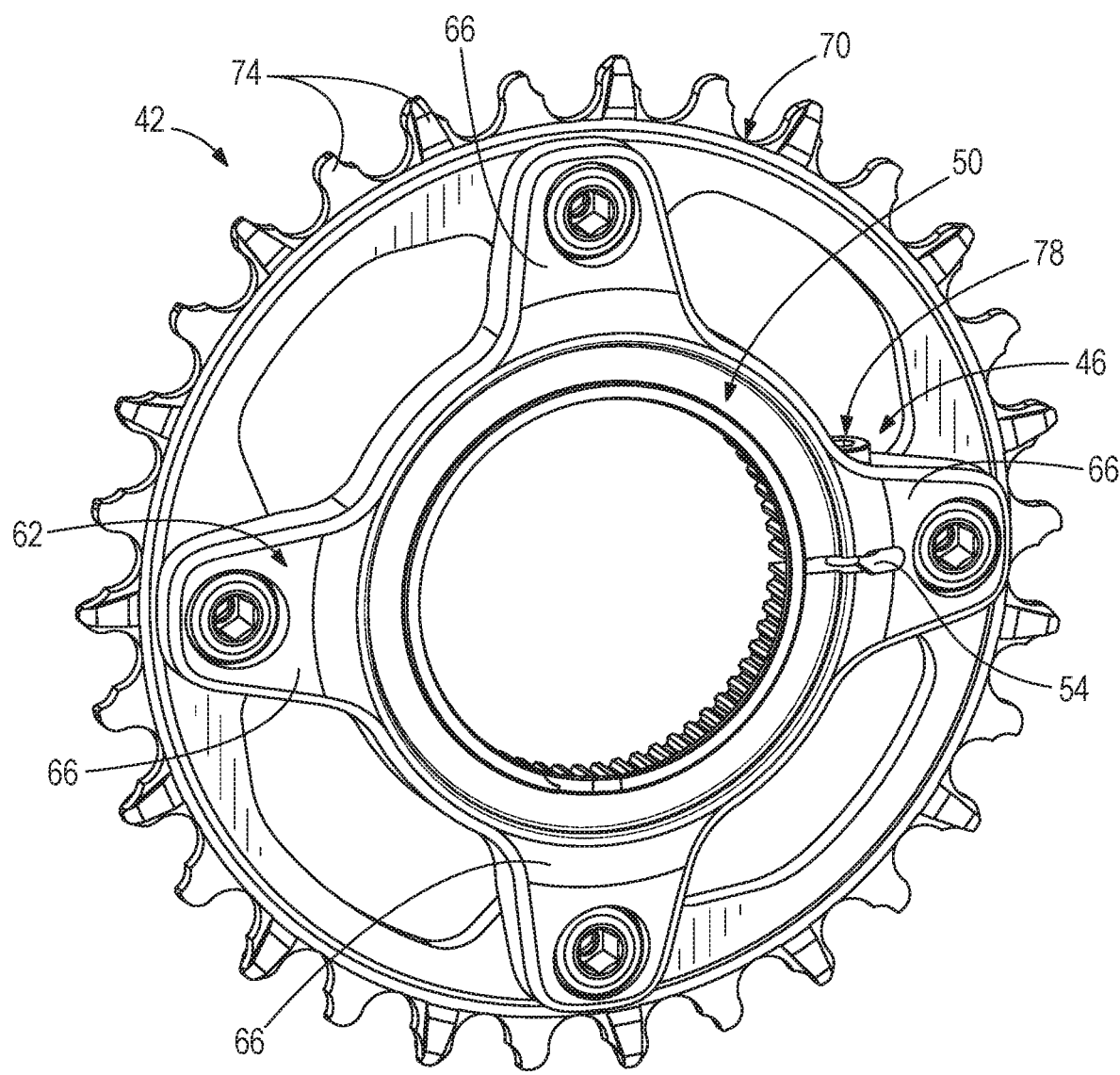
FIG. 4 is a front perspective view of the chainring assembly of FIG. 3.
Figure 5:
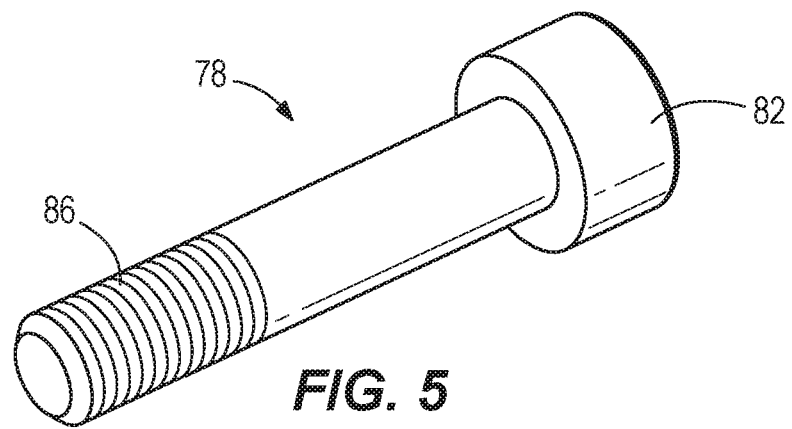
FIG. 5 is a perspective view of a fastener of the chainring assembly of FIG. 3.

Referring to FIGS. 3-5, the e-bike 10 (FIG. 1) further includes a chainring assembly 42. The chainring assembly 42 can be part of a drivetrain of the e-bike 10 (FIG. 1).

In many embodiments, the chainring assembly 42 can include a mounting portion 46 adapted to clamp onto the motor output shaft 30. For example, in some embodiments, the mounting portion 46 can clamp onto the splined region 34 of the motor output shaft 30. In many embodiments, the mounting portion 46 can include a circumferential ring 50 having a radial slot 54 permitting the chainring assembly 42 to be clamped onto the motor output shaft 30. The circumferential ring 50 can include splines 58 (e.g., ridges or teeth) at an inner circumference of the circumferential ring 50. In some embodiments, the splines 58 can be spaced (e.g., evenly spaced) apart from one another. Further, in some embodiments, adjacent splines of the splines 58 can be approximately parallel to each other. In many embodiments, the splines 58 can be implemented (e.g., sized, shaped, arranged, and otherwise configured) according to a spline standard. For example, in some embodiments, the splines 38 can be implemented according to a DIN spline standard of the German Institute of Standardization headquartered in Berlin, Germany. In many embodiments, a quantity of the splines 38 can be determined based on the spline standard implemented.

In many embodiments, splines 58 can be configured to mesh with splines 38. For example, in these or other embodiments, a spline standard implemented for splines 38 can be similar or identical to a spline standard implemented for splines 58.

With continued reference to FIGS. 3 and 4, the chainring assembly 42 further can include a spider portion 62 supported by the circumferential ring 50. In many embodiments, and as illustrated at FIGS. 3 and 4, the spider portion 62 can be integrally formed as a single piece with the circumferential ring 50, although, in other embodiments, the spider portion 62 can be coupled to the circumferential ring 50, such as, for example, with one or more fasteners (e.g., bolts). The spider portion 62 can include multiple radial arms 66. The radial arms 66 extend radially away from the circumferential ring 50. In many embodiments, and as illustrated at FIGS. 3 and 4, the spider portion 62 can include four radial arms 66 spaced (e.g., evenly spaced) apart from one another circumferentially about or around the spider portion 62. In other embodiments, different quantities and/or spacings of radial arms 66 can be implemented. In some embodiments, the radial slot 54 can be circumferentially aligned with at least one of the radial arms 66. Further, the radial slot 54 can extend radially along at least a portion or all of one radial arm of the radial arms 66, and the radial slot 54 can extend axially through at least a portion or all of the one radial arm of the radial arms 66 and through the circumferential ring 50.

With continued reference to FIGS. 3 and 4, the chainring assembly 42 further can include a chainring 70 supported by the spider portion 62. In many embodiments, and as illustrated at FIGS. 3 and 4, the chainring 70 can be coupled to the spider portion 62 via one or more fasteners, although, in other embodiments, the chainring 70 can be integrally formed as a single piece with the spider portion 62.

In many embodiments, and as illustrated in FIGS. 3 and 4, the chainring 70 can include teeth 74 at an outer circumference of the chainring 70. In some embodiments, the teeth 74 can be spaced (e.g., evenly spaced) apart from one another. Further, the teeth 74 can extend radially away from the spider portion 62. In many embodiments, the teeth 74 can be configured to receive a chain of a drivetrain of the e-bike 10 (FIG. 1). In some embodiments, teeth 74 can be omitted. For example, in these embodiments, the chainring 70 can receive a belt of a drivetrain of the e-bike 10 (FIG. 1).

In many embodiments, and as illustrated in FIGS. 3-5, the chainring assembly 42 further can include a fastener 78. Referring to FIG. 5, in many embodiments, the fastener 78 can include a head portion 82 and an elongate body 86 that extends from the head portion 82. In some embodiments, the elongate body 86 can include a threaded region. As explained in greater detail below, the fastener 78 can be used to tighten and clamp the circumferential ring 50 onto the motor output shaft 30. For example, the fastener 78 can be operable to draw opposing regions of the radial slot 54 closer together to reduce an inner circumference of the circumferential ring 50.

The chainring assembly 42 is configured to be coupled to the motor output shaft 30 such that rotational movement of the motor output shaft 30 (FIGS. 1 & 2) is translated to the chainring assembly 42 and to the chainring 70, and such that the chainring assembly 42 is held and/or locked in place on the motor output shaft 30 both axially and radially. For example, the circumferential ring 50 of the chainring assembly 42 can be placed axially and concentrically about or around the motor output shaft 30 (FIGS. 1 & 2), such that the splines 58 of the circumferential ring 50 face inwardly toward the splines 38 of the splined region 34, and/or are circumferentially mated (e.g., interlocked) with the splines 38 of the splined region 34.

The fastener 78 then can be used to tighten the circumferential ring 50 onto the motor output shaft 30. The circumferential ring 50 includes a first region 90 on one side of the radial slot 54, and a second region 94 on an opposite side of the radial slot 54. In an assembled state, the fastener 78 can be positioned through the first region 90, such that the head portion 82 is located on one side of the first region 90, and such that the elongate body 86 extends through the radial slot 54 (e.g., along a direction that is approximately perpendicular to a radial direction of the radial slot 54) and into the second region 94. In some embodiments, the fastener 78 can extend through an opening 98 (e.g., a threaded opening) into the second region 94, so as to secure the fastener 78 in place.

When the fastener 78 is tightened, the fastener 78 can pull the second region 94 closer to the first region 90, reducing a width of the radial slot 54. This movement pulls the circumferential ring 50 closer together circumferentially, thus pulling the splines 58 of the circumferential ring 50 into closer and tighter engagement with the splines 38 of the splined region 34, and with the motor output shaft 30 in general. Once the fastener 78 has been tightened, the circumferential ring 50 becomes clamped in place, and is inhibited from sliding axially along the motor output shaft 30. Thus, the use of the fastener 78 and the slotted circumferential ring 50 enables the chainring assembly 42 to be both axially and radially secured to the motor output shaft 30. In many embodiments, clamping the chainring assembly 42 to the motor output shaft 30 can prevent the chainring assembly 42 from wobbling during operation, thereby preventing or reducing damage to or wear on the motor output shaft 30.

In further embodiments, fastener 78 can be loosened to permit chainring assembly 42 to be removed from the motor output shaft 30. Loosening fastener 78 can facilitate removal of the chainring assembly 42 from motor output shaft 30, such as, for example, in order to perform maintenance on the e-bike 10 (FIGS. 1 & 2), and can obviate a use of tools that may damage motor output shaft 30 in connection with removing chainring assembly 42.

Various features of the invention are set forth in the following claims.

The invention claimed is:

1. An e-bike comprising:
   a frame assembly;
   a first wheel supporting the frame assembly and a second wheel supporting the frame assembly;
   a motor assembly coupled to the frame assembly and having a motor output shaft; and
   a chainring assembly including a mounting portion clamped circumferentially onto the motor output shaft;
   wherein the mounting portion of the chainring assembly is splined.

2. The e-bike of claim 1, wherein the motor output shaft is splined.

3. The e-bike of claim 1, wherein the mounting portion of the chainring assembly includes a circumferential ring having a radial slot permitting the chainring assembly to be clamped circumferentially onto the motor output shaft, wherein the radial slot has a circumferential width that is configured to be reduced when the mounting portion is clamped circumferentially onto the motor output shaft.

4. The e-bike of claim 3, wherein:
   the chainring assembly includes a spider portion having multiple radial arms; and
   the radial slot is circumferentially aligned with at least one of the multiple radial arms.

5. The e-bike of claim 4, wherein the chainring assembly further includes a chainring supported by the spider portion.

6. The e-bike of claim 5, wherein the chainring and the circumferential ring are non-coplanar.

7. The e-bike of claim 3, further comprising a fastener positioned through an opening in the chainring assembly and through a portion of the radial slot.

8. A chainring assembly for an e-bike, the chainring assembly comprising:
a mounting portion configured to be clamped circumferentially onto a motor output shaft of a motor assembly of the e-bike, wherein the mounting portion of the chainring assembly is splined.

9. The chainring assembly of claim 8, wherein the motor output shaft is splined.

10. The chainring assembly of claim 8, further comprising a spider portion having multiple radial arms, wherein a radial slot is circumferentially aligned with at least one of the multiple radial arms.

11. The chainring assembly of claim 10, further comprising a chainring supported by the spider portion.

12. The chainring assembly of claim 11, further comprising a circumferential ring, wherein the chainring and the circumferential ring are non-coplanar.

13. The chainring assembly of claim 10, further comprising an opening and a fastener positioned through the opening and through a portion of the radial slot.

14. The chainring assembly of claim 8, wherein the mounting portion of the chainring assembly includes a circumferential ring having a radial slot permitting the chainring assembly to be clamped circumferentially onto the motor output shaft, wherein the radial slot has a circumferential width that is configured to be reduced when the mounting portion is clamped circumferentially onto the motor output shaft.

15. The chainring assembly of claim 14, wherein the circumferential ring defines an interior opening, wherein the radial slot is open to the interior opening along a radially inner end of the radial slot, and wherein the radial slot is closed along an opposite, radially outer end of the radial slot.

16. The chainring assembly of claim 14, further comprising a spider portion having multiple radial arms that each extend from the circumferential ring, wherein the radial slot extends radially into one of the multiple radial arms along a portion of the radial arm, such that the radial slot is closed off at a radially outer end within the radial arm.

17. The chainring assembly of claim 14, further comprising a spider portion having multiple radial arms that each extend from the circumferential ring, and a chainring, wherein the multiple radial arms are fastened to the chainring, wherein the radial slot is a single radial slot, such that the circumferential ring extends circumferentially between a first circumferential side of the radial slot and a second, opposite circumferential side of the radial slot.

18. A chainring assembly for an e-bike, the chainring assembly comprising:
a mounting portion configured to be clamped onto a motor output shaft of a motor assembly of the e-bike;
a circumferential ring having a radial slot permitting the chainring assembly to be clamped onto the motor output shaft;
a spider portion having multiple radial arms, wherein the radial slot is circumferentially aligned with one of the multiple radial arms; and
a chainring supported by the spider portion, wherein the chainring and the circumferential ring are non-coplanar.

19. The chainring assembly of claim 18, wherein the mounting portion is splined.

* * * * *